United States Patent

[11] 3,554,311

[72] Inventors Jack M. Thompson;
Michael J. Thompson, Ardmore, Okla.
[21] Appl. No. 749,695
[22] Filed Aug. 2, 1968
[45] Patented Jan. 12, 1971
[73] Assignee Revolt, Inc.
Ardmore, Okla.
a corporation of Delaware

[54] ELECTRICAL VEHICLE
7 Claims, 4 Drawing Figs.
[52] U.S. Cl..................................................... 180/34,
280/281, 280/295, 180/101
[51] Int. Cl...................................................... B62k 11/02
[50] Field of Search.......................................... 180/34, 30,
33, 103, 101; 280/281, 293, 295, 301

[56] References Cited
UNITED STATES PATENTS
| | | | |
|---|---|---|---|
| 1,832,018 | 11/1931 | Gossard.................. | 180/34 |
| 2,937,884 | 5/1960 | Lossau..................... | 280/281 |
| 3,101,805 | 8/1963 | Tritle....................... | 180/33X |
| 3,372,768 | 3/1968 | Wresch.................... | 180/34 |
| 3,384,389 | 5/1968 | Polley...................... | 280/295 |

Primary Examiner—Kenneth H. Betts
Attorney—Berveridge & De Grandi

ABSTRACT: A two-wheeled electrically powered vehicle has a body formed of tubular members and a unitary panel assembly which encloses the mechanisms therewithin. An elevatable footrest carries a ground-engaging support which lowers upon raising the footrest.

PATENTED JAN 12 1971

INVENTORS
JACK M. THOMPSON
MICHAEL J. THOMPSON

BY Browne, Schuyler & Beveridge

ATTORNEYS

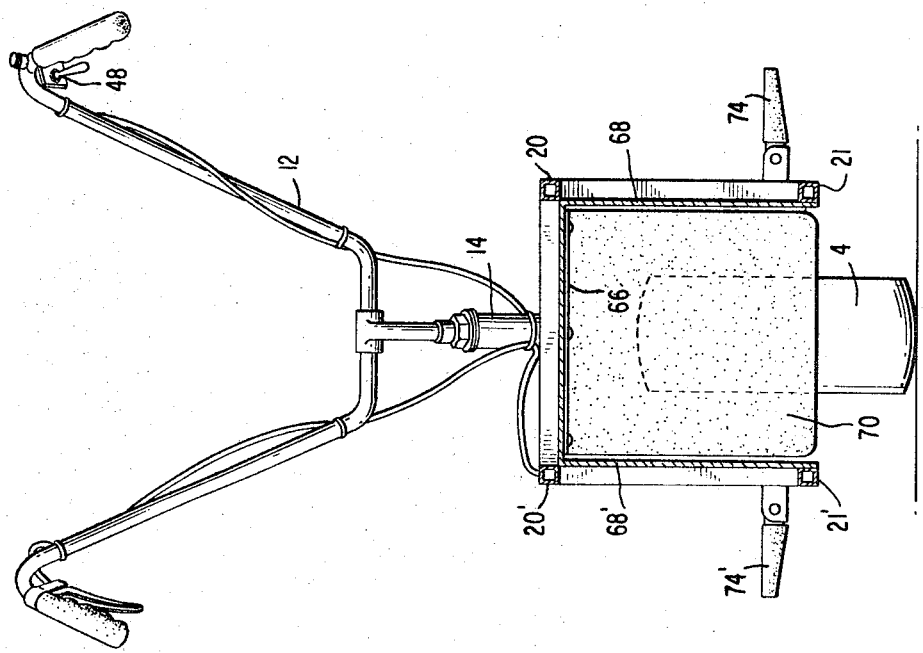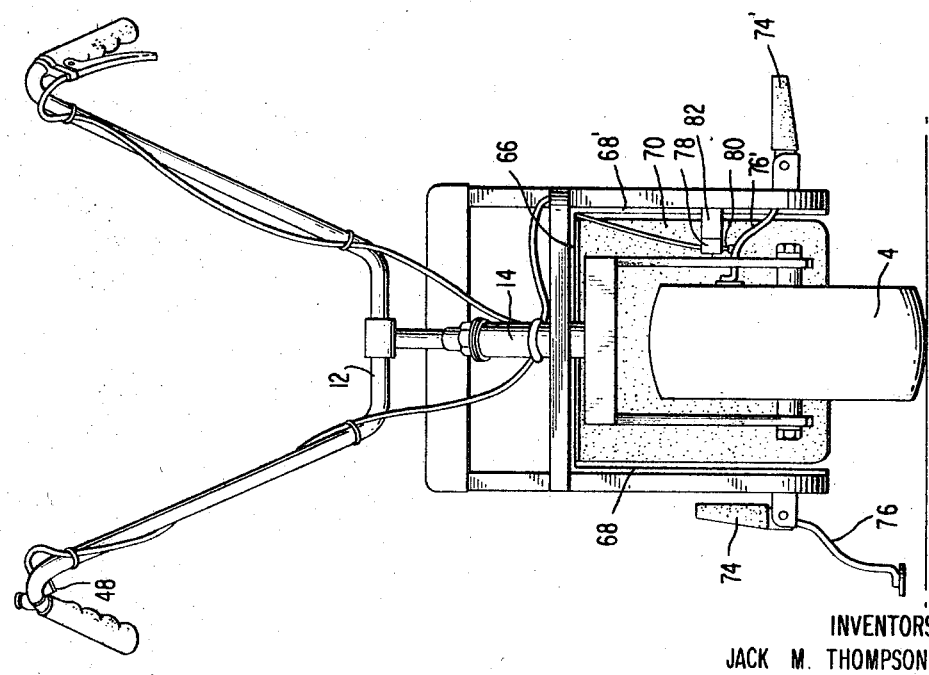
INVENTORS
JACK M. THOMPSON
MICHAEL J. THOMPSON
BY Browne, Schuyler & Beveridge
ATTORNEYS 3,554,311

ELECTRICAL VEHICLE

BACKGROUND

This invention is directed to an electrically powered two-wheeled vehicle which is adapted for use as a recreational vehicle or for utilitarian purposes.

Electrical vehicles are well known and are used for transportation in large factories and on golf courses. Usually, these prior art vehicles have three or four wheels in order to provide the stability at their relatively low running speeds.

SUMMARY

This invention, in one aspect, involves a novel body construction for a two-wheeled electrically powered vehicle wherein the body frame includes a pair of interconnected longitudinally extending vertical assemblies formed of structural members. The vertical assemblies are spaced apart a sufficient distance to accommodate a battery therebetween. In order to provide the vehicle with a low center of gravity, the battery has its bottom surface approximately at the elevation of the lowermost portion of the assemblies and no higher than a line drawn between the axes of rotation of the wheels.

The invention also is directed to a movable footrest which carries a support leg which is lowered to a ground-contacting position as the footrest is moved from its horizontal foot-supporting position to its inoperative position.

One object of the invention is to provide a simple, attractive, strong and durable electrical vehicle which is capable of being produced at a relatively low cost.

Another object is to provide a simple and convenient vehicle-supporting stand which is associated with a footrest in a manner whereby the stand is lowered as the footrest is moved to its inoperative position.

THE DRAWINGS

FIG. 3 is a transverse sectional view taken along the line 3—3 in FIG. 2, showing the relationship between the structural members of the vehicle frame and the housing of the frame; and FIG. 4 is a front view of the vehicle of this invention, showing the manner in which the footrest is associated with the ground-contacting support leg.

DESCRIPTION OF THE ILLUSTRATED EMBODIMENT

Figure 1:
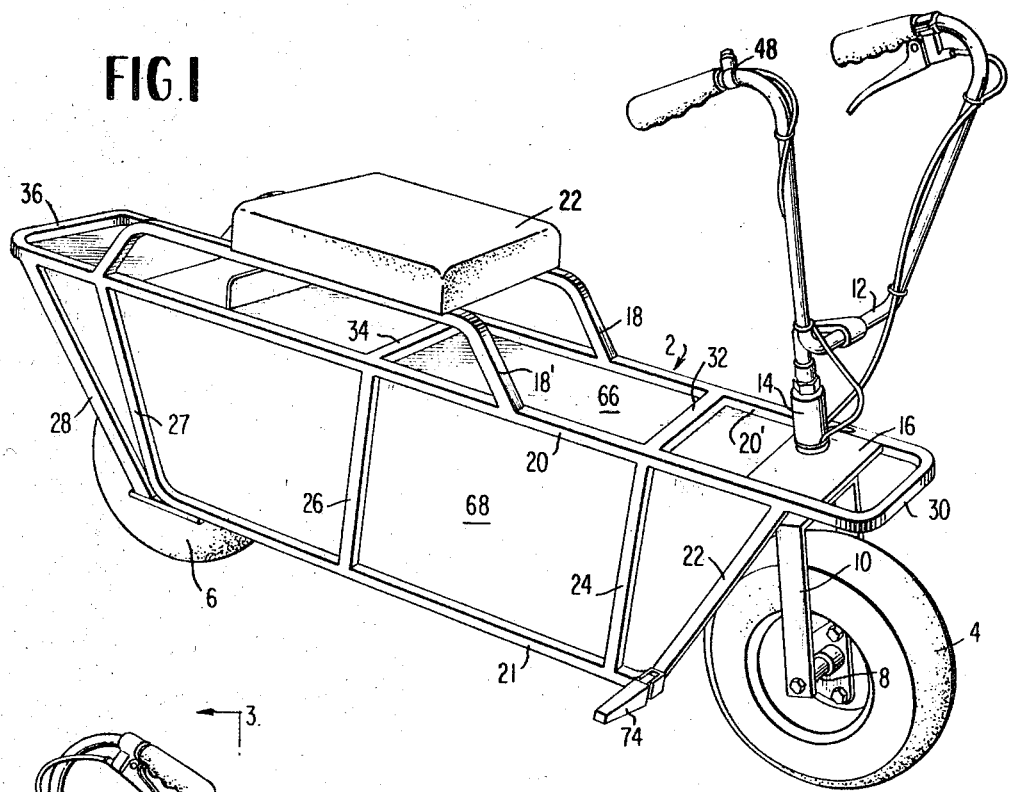
FIG. 1 is a perspective view of a preferred form of vehicle which embodies the features of this invention.

As shown in FIG. 1, the vehicle of this invention comprises a frame 2 which is supported for movement across the ground on a pair of wheels 4 and 6. The front wheel 4 is rotatably mounted on an axle 8 which extends between the legs of a fork 10. Steering of the vehicle is accomplished in a usual fashion by turning the handlebar assembly 12 which is attached to a portion of the fork which rotates within the bearing housing 14. A plate 16 on the frame 2 supports the bearing housing 14. Propulsive power is provided by the rear wheel 6 in a manner described in a later portion of this specification.

The vehicle frame 2 includes a series of interconnected tubular structural members which support the internal mechanisms, and a housing formed of interconnected panels which is attached to the tubular members to enclose and protect the internal mechanisms of the vehicle. The structural members include a pair of longitudinally extending members 18 and 18' which support a cushion seat 22 for the occupant.

The tubular structural members are arranged to form a pair of spaced apart longitudinally extending vertical assemblies. The vertical assembly on the right side is formed of the members 18, 20, 21, 22, 24, 26, 27 and 28. The corresponding elements in the vertical assembly on the left side, when shown, are designated by similar primed numerals. These vertical assemblies are rigidly interconnected by the seat 22 and the transverse structural members 30, 32, 34, 36, 38 and 40.

Figure 2:
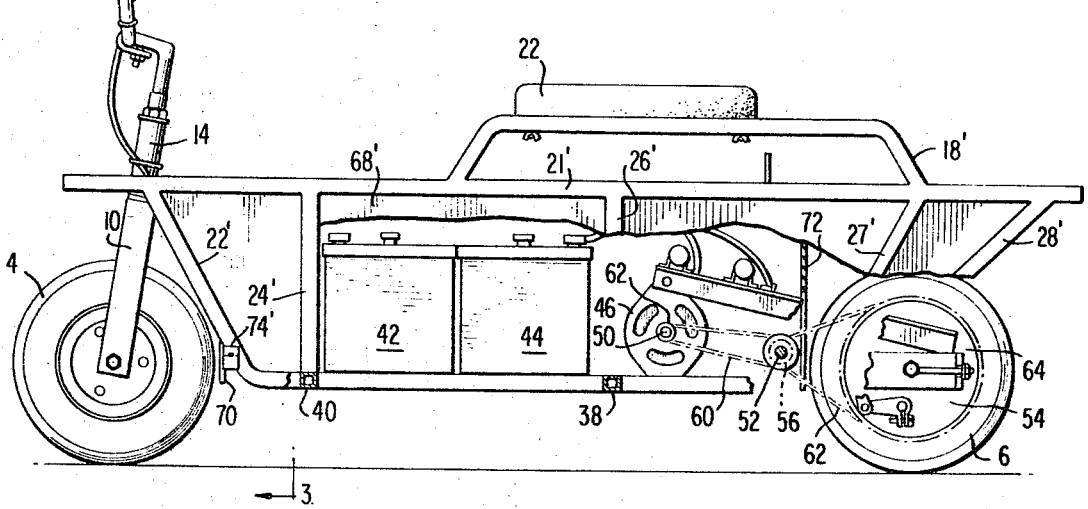
FIG. 2 is a sectional view of the vehicle, showing the batteries, motor and drive train located within the vehicle frame.

Referring to FIG. 2, it will be noted that the structural members of the frame 2 support a pair of batteries 42 and 44 which are electrically connected in a known manner to the electric drive motor 46. Preferably, these electrical connections include a speed control switch 48 on the handle bar assembly which is moveable from a central "off" position to either of two "on" positions. In one "on" position, the switch 48 actuates a solenoid which connects the batteries 42 and 44 to the motor 46 through a heavy duty electrical resistor to provide a low-speed operation. In its other "on" position the speed control switch 48 closes another solenoid switch which connects the batteries directly to the motor 46 for high-speed operations.

The output shaft 50 of the motor 46 may carry a sprocket which directly drives a sprocket on the rear drive wheel 6. With such an arrangement, the ratio of angular velocities between the motor shaft and the wheel 6 may be in the order of about 12:1.

In the illustrated construction, a jack shaft 52 is interposed in the drive train between the motor shaft 50 and the driven sprocket 54 on the wheel 6. A pair of sprockets 56 and 58 are keyed for rotation with the jack shaft 52. The larger sprocket 56 is connected by a drive chain 60 to the sprocket 62 on the motor shaft 50. The smaller sprocket 58 carries a chain 62 which drives the rear wheel 6 through the sprocket 64. With this arrangement, the angular velocity of the motor shaft 50 is approximately eight times that of the wheel 6.

Stability of the vehicle is provided by placing the batteries 42 and 44 at a relatively low position so that their lower surfaces are at the approximate elevation of the structural members 21 and 21', below a line extending between the axes of rotation of the two wheels 4 and 6.

The internal elements of the vehicle are enclosed by a top panel 66 and side panels 68 and 68'. As shown in FIG. 3, these panels are formed of a single sheet of metal which has a transverse cross section in the shape of an inverted U.

Of course, the purposes of the panels 66, 68 and 68' are to improve the appearance of the vehicle and to protect the internal elements from the weather. In order to prevent water or mud from being thrown into the internal elements when the vehicle is moving, there are a pair of flexible flaps 70 and 72 which are connected to the interior of the top panel 66. The flexibility of these flaps 70 and 72 is important since it permits the entire housing formed of the panels to be slid in a longitudinal direction into the structural framework of the vehicle.

When the vehicle is underway, the occupant will usually place his feet on the footrests 74 and 74'. These footrests are commercially available items which are movable from the horizontal foot supporting position assumed by the footrest 74' in FIG. 4 to the raised inoperative position taken by the footrest 74' in FIG. 4 to the raised inoperative position taken by the footrest 74 in FIG. 4. The footrest is held in either of these positions by the resilience of the tread element which acts against either the horizontal or vertical surface of the footrest support bracket.

This invention involves a modification of the footrest construction which provides a stand for supporting an unoccupied or stationary vehicle. This modification involves the attachment of ground-contacting support legs 76 and 76' to the footrests 74 and 74'. As seen in FIG. 4, when the footrest 74' is in its raised or inoperative position, the support leg 76 is in its lowered position where it will prevent the vehicle from falling over.

In order to avoid the possibility of a runaway vehicle should the speed control switch become stuck in either of its "on" positions, a safety switch 78 which has a plunger 80 is mounted on the frame by a bracket 82. See FIG. 1. The safety switch is normally open and will close only upon depression of the plunger 80.

The mounting of the footrest 74' is such that when it is subjected to any external weight, it will elevate slightly to an intermediate position due to the counterbalancing effect of the leg 76'. The safety switch is located in the path of the leg 76' at a position where it will close only when the footrest 74' is depressed from its intermediate position. Of course, such depression will occur when the occupant places his weight on the footrest 74'. In this manner, the electrical circuit between the battery and the motor can be completed only when the occupant is in a riding position with his foot on the footrest 74'. And, if the vehicle is underway and fails to respond to its usual controls, it may be stopped by the occupant who merely raises his foot from the footrest 74'.

From the foregoing description, it will be appreciated that we have devised an improved electrical vehicle which presents several advantages as a result of the simple but efficient construction of the frame and due to the interrelated footrest and support leg. These features may assume various forms and may be utilized in vehicles which differ considerably from the illustrated preferred embodiment. The breadth of the invention is not limited to the disclosed embodiment but is defined by the claims which follow.

We claim:

1. A power vehicle comprising a frame, only a pair of wheels supporting the frame, one of said wheels being a steering wheel and another of said wheels being a drive wheel, and electric storage battery supported on the frame, an electric motor, means for electrically connecting the motor to the battery, a drive train interconnecting the motor and the drive wheel; said drive train including a jackshaft carrying a pair of jackshaft sprockets, a chain connecting one of the jackshaft sprockets to the sprocket on the motor, and another chain connecting the other jackshaft sprocket to the sprocket on the drive wheel; said frame having a pair of longitudinally extending vertical assemblies formed of structural members, said assemblies being horizontally spaced apart a distance greater than the corresponding horizontal dimension of the battery, means rigidly interconnecting said vertical assemblies, said battery being located between the vertical assemblies with its bottom surface lying at the approximate elevation of the lowermost portions of the assemblies.

2. A power vehicle comprising a frame, only a pair of wheels supporting the frame, one of said wheels being a steering wheel and another of said wheels being a drive wheel, an electric storage battery supported on the frame, an electric motor, means for electrically connecting the motor to the battery, a drive train interconnecting the motor and the drive wheel, said frame having a pair of longitudinally extending vertical assemblies formed of structural members, said assemblies being horizontally spaced apart a distance greater than the corresponding horizontal dimension of the battery, means rigidly interconnecting said vertical assemblies, said battery being located between the vertical assemblies with its bottom surface lying at the approximate elevation of the lowermost portions of the assemblies, a footrest attached to the frame and being movable from a generally horizontal foot-supporting position to an inoperative position, and a ground-contacting support leg attached to the footrest for movement therewith, said support leg being movable from a raised inoperative position when the footrest is in its foot-supporting position to a lowered ground-contacting position when the footrest is in its inoperative position.

3. A vehicle according to claim 2 wherein the footrest is pivoted on the frame about a horizontal axis which extends longitudinally of the vehicle.

4. A power vehicle comprising a frame and wheels supporting the frame in a manner permitting the inclination of the frame about its longitudinal axis, a footrest attached to the frame and being movable from a generally horizontal foot-supporting position to an inoperative position, and a ground-contacting support leg attached to the footrest for movement therewith, said support leg being movable from a raised inoperative position when the footrest is in its foot-supporting position to a lowered ground-contacting position when the footrest is in its inoperative position.

5. A vehicle according to claim 4 wherein the footrest is pivoted on the frame about a horizontal axis which extends longitudinally of the vehicle.

6. A vehicle according to claim 4 wherein the footrest is arranged to lie at an intermediate position which lies between the foot-supporting position and the raised inoperative position when no external weight is supported thereon, and an electrical switch associated with the footrest and arranged to open when the footrest is in its intermediate position and to close when the footrest is moved to its foot-supporting position when weight is applied to the footrest, a battery and an electric motor being electrically connectable to propel the vehicle, said switch being a portion of an electric circuit between the motor and the battery, thereby preventing energization of the motor when no weight is supported by the footrest.

7. A power vehicle comprising a frame, wheels including a drive wheel for supporting the frame, an electric motor, a drive train interconnecting the motor and the drive wheel, a battery, circuit connecting the battery to the motor, a footrest, an electrical switch forming a portion of said circuit, said switch being associated with the footrest and arranged to close only when an external weight is applied to the footrest, thereby preventing energization of the motor when no external weight is supported by the footrest.